Patented Aug. 24, 1926.

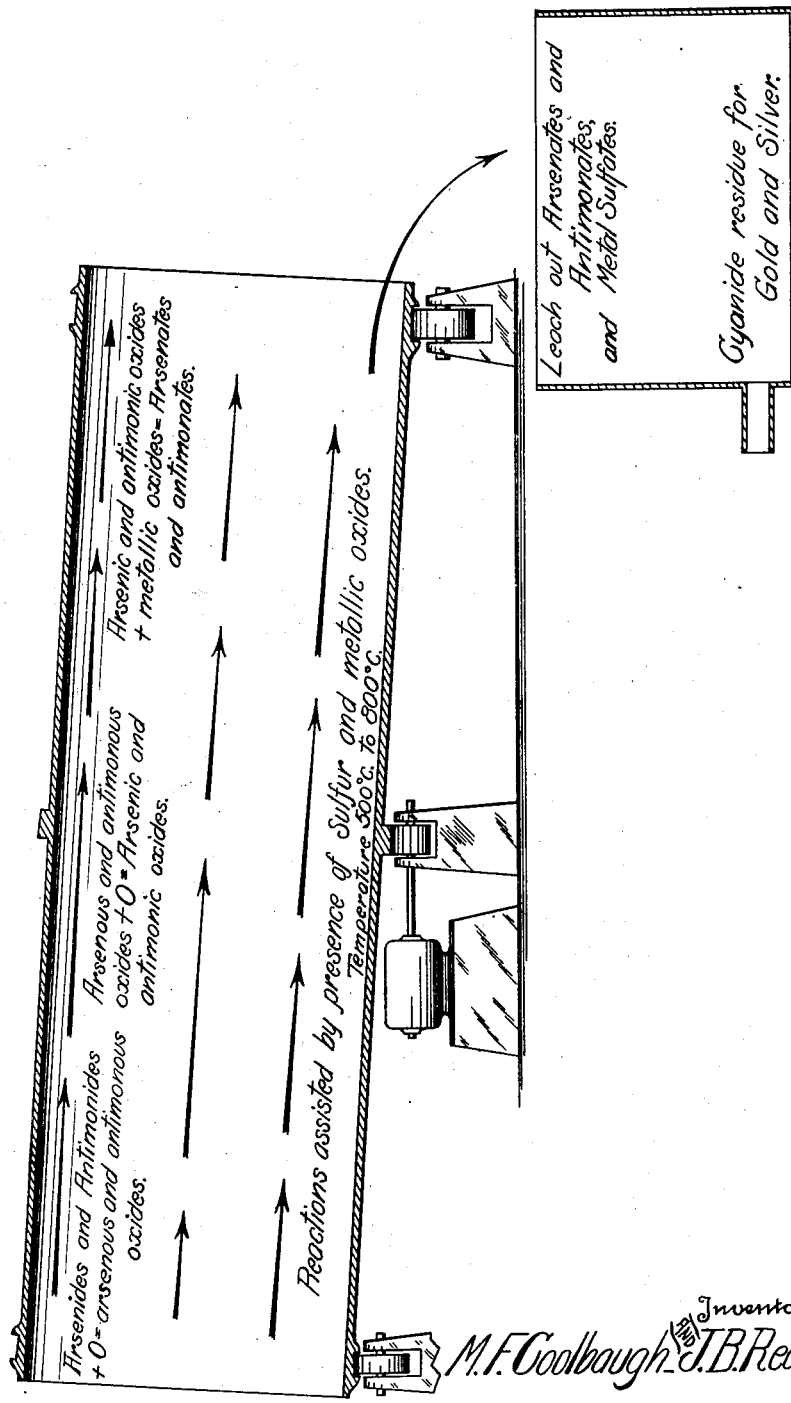

1,597,018

UNITED STATES PATENT OFFICE.

MELVILLE F. COOLBAUGH AND JOHN BURNS READ, OF GOLDEN, COLORADO, ASSIGNORS TO THE COMPLEX ORES RECOVERIES COMPANY, OF DENVER, COLORADO, A CORPORATION OF COLORADO.

PROCESS FOR TREATING ARSENIC AND ANTIMONY COMPOUNDS AND MINERALS.

Application filed March 4, 1922. Serial No. 541,080.

This invention relates to the treatment of ores, speisses, and other materials containing arsenic and antimony for the separation of the arsenic and antimony and the recovery of the metallic values.

The object of the invention is to change the combined arsenic and antimony to arsenates and antimonates which are soluble in acids or alkalis, and by this means to separate them from precious metal values in the residue and thus render such values readily recoverable.

Silver and gold with other metallic values often occur in nature associated with arsenic and antimony. When such ores or concentrates are treated at the smelter, a metallic arsenide or antimonide called "speiss" is formed which carries precious metals as well as cobalt, nickel, iron and the like. The recovery of these metal values from arsenic and antimony ores and from speiss is a problem which heretofore has not been satisfactorily solved. Arsenic and antimony compounds, either before or after ordinary roasting, are not efficiently treated with cyanide for the recovery of the precious metals.

These difficulties are overcome by the present invention which comprises roasting ores and concentrates of arsenic and antimony and forming highly oxidized compounds such as arsenates and antimonates in connection with the roast. The roasted material is then treated with dilute sulfuric acid or other mineral acid, a small quantity of a chloride being present to render the silver insoluble. After washing, the residue from this leach is treated with any suitable extracting agent, for example cyanide solution, in the usual manner for the recovery of the gold and silver, or it may be sent to the smelter for recovery of gold and silver. The solution contains metal sulfates and the arsenic and antimony in the form of arsenates and antimonates, and from it the values may be recovered by precipitation methods.

Instead of using sulfuric acid to extract the roasted material, an alkali hydroxide such as sodium hydroxide may be employed, which will effect the solution of the arsenic as sodium arsenate. The residue, which will contain most of the antimony and the metallic elements, may be extracted with sulfuric acid first and then with cyanide, or it may be extracted with cyanide directly, or it may go to the smelter.

The invention is carried out by roasting the arsenic or antimony ore or concentrates or speiss in any ordinary type of roasting furnace. The material to be roasted and the air required for the roast are caused to travel together in the same direction along with the products of the roast throughout the entire roasting operation.

The figure comprises a diagrammatic representation of the reactions of the herein described process, in conjunction with an ordinary rotary furnace, in which the process may be carried out.

In tracing the chemistry of the roasting process, arsenic will be used by way of illustration, with the understanding that antimony reacts in a similar manner.

The arsenides are oxidized by this treatment in the roasting furnace, first to arsenious oxide which volatilizes under the influence of the heat. This compound as it is carried along with the metallic oxides and with an excess of oxygen in the air, is oxidized to arsenic oxide, which is less volatile and reacts with the metallic oxides forming arsenates. The formation of arsenates from arsenides and other arsenic compounds is somewhat similar to the formation of sulfates from sulfur and sulfides. During the roasting operation sulfur as such or in the form of sulfides may or may not be present. However, the oxidation of arsenic is somewhat accelerated by the presence of such sulfur or sulfur compounds, and with ores or concentrates deficient in sulfur it would be advisable to make additions of sulfur or sulfide minerals. The presence of metallic oxides also has an influence upon the rate of oxidation of the arsenic. The principal oxides which influence this rate are ferric oxide, cupric oxide, lead oxide, manganese oxides and silica. Thus, by the addition of pyrite the rate of roasting of the arsenic is accelerated from the standpoint of the sulfur and also that of the iron which produces ferric oxide.

The temperature control during roasting is not exacting. Good results have been obtained by roasting between 500° C. and 800° C. It is advisable to keep the temperature below the sintering stage so that more rapid chemical action may be effected. The temperature of decomposition of many arsenates, notably iron, calcium and lead arsenates, is at or above 800° C. so that close temperature regulation for the formation of these salts is not required.

We claim:

1. A process of treating arsenic and antimony minerals comprising roasting the same in the presence of oxygen, and advancing the minerals and the products of the roast together in the same direction to convert the arsenic and antimony into arsenates and antimonates.

2. A process of treating arsenic and antimony minerals comprising roasting the same to form arsenic and antimony oxides, and carrying said oxides along with metallic oxides to convert the same into arsenates and antimonates.

3. A process of treating arsenic and antimony minerals comprising roasting the same to convert the antimony and arsenic into volatile oxides, continuing the roast to form less volatile arsenic and antimony oxides, and carrying the latter oxides along with metallic oxides to form arsenates and antimonates.

4. A process of treating arsenic and antimony minerals comprising roasting the same in the presence of oxygen, advancing the minerals together in the same direction with the gases thereby bringing the arsenic and antimony compounds into contact with metal oxides for conversion of the arsenic and antimony into soluble forms.

5. A process of treating ores containing arsenic and antimony, which comprises mixing the ore with a sulphur containing substance to accelerate oxidation of the arsenic and antimony, advancing and roasting the mixed mass in a current of an oxygen containing gaseous reagent flowing in the same direction as the ore, and recovering the products of reaction.

6. A process of treating ores containing arsenic and antimony, which comprises adding a sulphur containing substance to the ore to accelerate oxidation of the arsenic and antimony, advancing and roasting the mass in a stream of air flowing in the same direction as the ore, and recovering the products of reaction.

7. A process of treating ores containing arsenic and antimony, which comprises adding a sulphide to the ore to accelerate oxidation of the arsenic and antimony, advancing and roasting the mass in a stream of air flowing in the same direction, then reacting upon the hot roasted mass with the hot fume bearing gases to convert the arsenic and antimony into forms which are soluble, and at a lower temperature extracting the resulting mass with a solvent solution.

8. A process of treating ores containing arsenic and antimony, and basic elements, which comprises advancing and roasting the mass in a stream containing air flowing in the same direction, then forming arsenates and antimonates with the heated basic elements, and at a lower temperature extracting the arsenates and antimonates, and then treating the residue with other extracting reagents.

9. A process of treating ores containing arsenic, antimony, and basic elements, which comprises advancing and roasting the mass in a stream of air flowing in the same direction, then reacting upon the roasted mass with the hot fume bearing gases forming arsenates and antimonates, then extracting the soluble matter from the mass, and then treating the residue with reagents to extract insoluble matter.

10. A process of treating ores containing arsenic and antimony, which comprises adding a sulphide to the ore to accelerate oxidation of the arsenic and antimony, advancing and roasting the mass in a stream of air flowing in the same direction, then reacting upon the hot roasted mass with the hot fume bearing gases to convert arsenic and antimony into forms which are soluble, and at a lower temperature extracting the resulting mass with a solution containing sulphuric acid.

11. A process of treating ores containing arsenic and antimony, and basic elements, which comprises advancing and roasting the mass in a stream of air flowing in the same direction, then reacting upon the roasted mass with the hot fume bearing gases forming arsenates and antimonates, then extracting the soluble matter from the mass with a solution containing sulphuric acid, and then treating the residue with reagents to extract insoluble matter.

12. A process of treating ores containing arsenic and antimony, and basic elements, which comprises advancing and roasting the mass in a stream of air flowing in the same direction, then reacting upon the roasted mass with the hot fume bearing gases forming arsenates and antimonates, then extracting the soluble matter from the mass with a solution containing sulphuric acid, and subsequently treating the residue with a reagent to extract gold and silver.

In testimony whereof we affix our signatures.

MELVILLE F. COOLBAUGH.
JOHN BURNS READ.